J. HUTTON.
MACHINE FOR PLANTING POTATOES AND OTHER SEED.
APPLICATION FILED JUNE 22, 1920.

1,352,411.

Patented Sept. 7, 1920.
2 SHEETS—SHEET 1.

Inventor
John Hutton
By [signature]
Atty

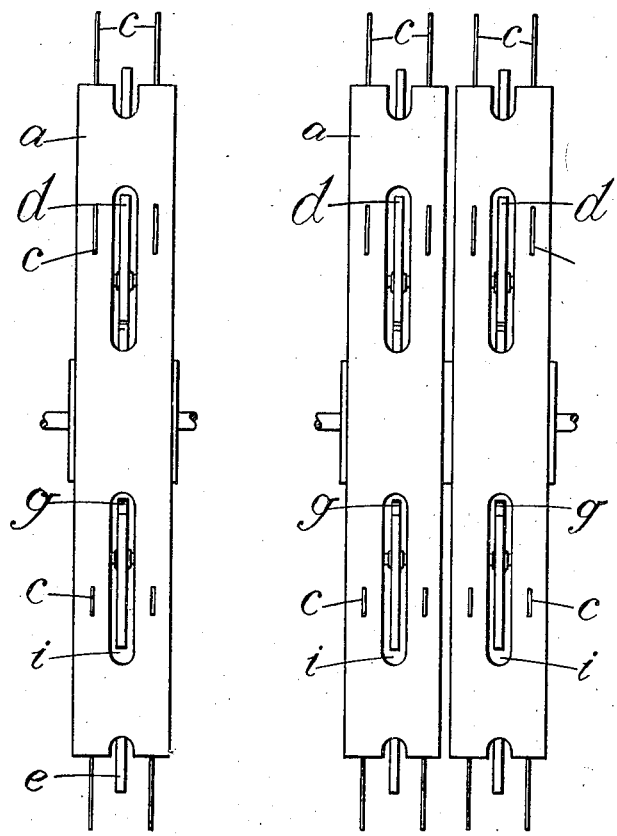

UNITED STATES PATENT OFFICE.

JOHN HUTTON, OF GIBLISTON, COLINSBURGH, SCOTLAND.

MACHINE FOR PLANTING POTATOES AND OTHER SEED.

1,352,411.  Specification of Letters Patent.  Patented Sept. 7, 1920.

Application filed June 22, 1920. Serial No. 390,957.

*To all whom it may concern:*

Be it known that I, JOHN HUTTON, a citizen of the United Kingdom of Great Britain and Ireland, and resident of Gibliston, Colinsburgh, Fife, Scotland, have invented certain new and useful Improvements in Machines for Planting Potatoes and other Seed, of which the following is a specification, such as will enable others skilled in the art to which it appertains to make and use the same.

This invention relates to a machine for planting potatoes and other suitable seeds at predetermined and substantially equal distances, and is of that kind in which a rotating drum or equivalent driven from the land or traveling wheels of the machine is provided with carriers adapted to pass through a supply hopper and abstract or lift a potato, spring-controlled elements formed with fingers being provided to hold the potato on the carriers until the potato is brought to the position where it has to be planted.

The object of the present invention is to provide an improved machine of the kind referred to which will be capable of being easily constructed and be very efficient in operation.

To these ends in accordance with the present invention I provide a machine for planting potatoes or other seed comprising a rotating drum provided on its periphery with carriers arranged in pairs and secured to the periphery of the drum and being adapted to pass through a supply hopper and abstract or lift a potato, pivoted elements having fingers being provided within the drum and being adapted to pass through slots in the periphery thereof and to hold the potato on the carriers until the potato is brought to the position where it has to be planted.

One end of each of the pivoted elements is caused to engage the potato by means of a spring, the other ends of the elements being adapted to be passed between the carriers and push therefrom any potato which may be adhering thereto.

A restraining device of cam-like form is provided and is fixed to the frame of the machine. This device controls the springs adapted to act on the elements to cause the pointed ends or fingers to pierce the potatoes and hold them until pushed off or allowed to fall on the underside.

If desired a share, colter or disk may be provided on the front of the machine to open the ground to receive the seeds so that the trench is made as the machine is advanced by traction or if desired by a motor carried on it.

In order that the invention may be clearly understood reference will now be had to the accompanying drawing wherein my improved machine is illustrated.

Fig. 2 is an end view of the drum, and

Fig. 3 is an end view of a pair of drums adapted to plant two rows of potatoes or other seed at the same time.

Figure 1:
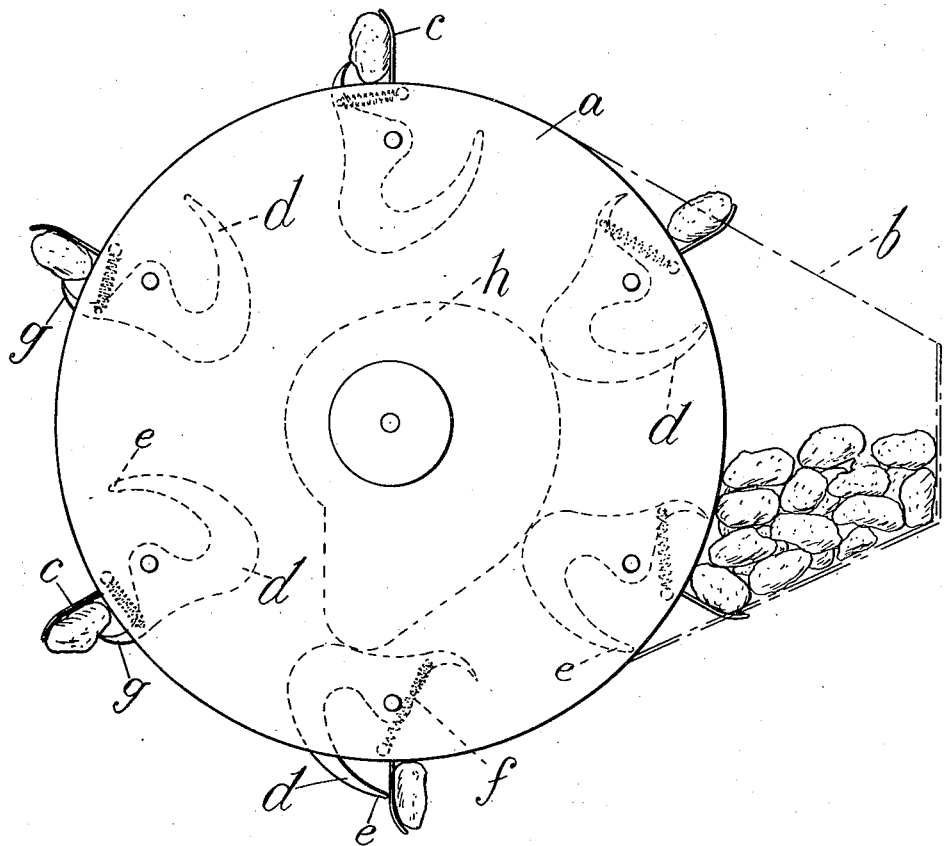
Figure 1 shows a rotating drum and supply hopper partly in section.

On the drawings $a$ is a rotating drum which is driven in any suitable manner from the land or traveling wheels, not shown, of the machine and is adapted to take the potatoes or other seeds from a hopper $b$ the hopper being located in the rear of the drum.

On the periphery of the drum are mounted a series of carriers $c$ in substantially radial manner, with the ends either straight or slightly bent in the direction of travel. The carriers are arranged in pairs as shown clearly in Figs. 2 and 3.

Inside the drum are a number of elements $d$, each of which is mounted on a pivot $d'$ in the drum. Each element is formed at one end with a sharpened finger $g$, slightly turned toward the pivot $d'$, while the opposite end of each element is formed with a curved blunt finger $e$.

As stated, the fingers $g$ are pointed, and are adapted to pierce the potatoes or other seeds in the rotation of the drum, while the blunt fingers $e$, are at the proper time brought into position behind the seed to kick same from the carriers. The springs are so arranged that when the elements are properly positioned, the fingers $g$ will be suddenly forced into the potatoes. A fixed cam-like restraining device $h$ is arranged within the drum and each element in its rotation with the drum contacts with the cam edge. When an element contacts with the cam, said element is rocked on its pivot and the sharpened finger $g$, is retracted, and the blunt finger is projected to engage the opposite side of the seed to remove same from the drum.

Slots $i$ are provided in the periphery of the drum to permit the ends of fingers $e$ and $g$ of the elements $d$ to pass there-through and to contact with the potatoes or other seed, the slots being formed between each pair of carriers c.

The hopper is provided with a slot or opening, not shown, to enable the carriers c to pass thereinto.

In operation as the machine is moved over the ground the drum a is rotated and the carriers c sweep through the hopper b and take up one potato. As the rotation of the drum is continued the element d is moved out of contact with the cam or restraining device h, when the spring f acts to rock the element on its pivot, and the finger g is thrust through the slot i and beyond the periphery of the drum to pierce the potato and hold it firmly against the adjacent carrier c until it reaches the point where the potato has to be dropped. When the potato is to be dropped, the element d, contacts with the restraining device h and said element is rocked in the opposite direction and the pointed finger g is withdrawn from engagement with the potato and the latter will fall by gravity to the ground. If however, the potato fails to fall when the finger g, is retracted, the blunt finger e, which at the same time is thrust through the slot and beyond the periphery of the drum engages behind the potato and pushes same from the carrier.

At about the time the respective elements are rocked to withdraw the fingers g, and project the fingers e, the cam is so shaped and disposed as to retain the elements in this position for a short length of time. That is, merely sufficient to kick the potato from the carrier. Then upon further movement of the drum, the element is reversely rocked, and the ends of the fingers are positioned wholly within the periphery of the drum. This position of the elements is maintained during the period of picking up a potato from the hopper, and until the elements reach a point where they are out of contact with the cam, and come under the influence of the springs.

Any suitable number of rows of potatoes may be planted at the same time. For example, I have shown in Fig. 3 drums adapted to plant two rows. The space between the drums will depend on the distance between the rows of potatoes. Any suitable means may be provided to adjust or vary the distance between the drums. Each drum is preferably furnished with a separate hopper.

It is usual for potato planters to have prepared outlets in the form of confined spaces or tubes and the potatoes may need forcing through these and are thus crushed. In my machine there is no such confined space and the potatoes do not get injured.

What I claim and desire to secure by Letters Patent is:—

1. In a machine for planting seed such as potatoes and of the kind in which the seed is carried in a hopper mounted upon wheels, the combination of a rotatable drum, elements pivotally mounted on the drum, each element being provided at opposite ends with fingers adapted at different predetermined times to extend beyond the periphery of the drum, springs controlling the elements, carriers projecting from the periphery of the drum, and a non-rotating cam adapted to move the elements against the action of the springs, and to rock said elements on their pivots and project the respective fingers beyond the periphery of the drum.

2. In a machine for planting seed such as potatoes and of the kind in which the seed is carried in a hopper mounted upon wheels, the combination of elements pivotally mounted in the drum, each element having at one end a sharp finger, and at its opposite end a blunt finger, springs controlling the elements in one direction, carriers projecting from the periphery of the drum, and a non-rotating cam adapted at predetermined times to reversely rock the elements against the action of the springs, and cause the fingers at the opposite ends of the elements to be projected beyond the periphery of the drum.

3. A machine for planting seed potatoes comprising a rotatable drum, elements pivotally mounted in the drum, each element having at one end a blunt finger, and a sharp finger at the opposite end, springs adapted to hold the elements in position to cause the sharp finger to project beyond the periphery of the drum, carriers mounted upon the periphery of the drum, a non-rotating cam within the drum and adapted to temporarily overcome the action of the spring and to withdraw the sharp finger and cause the blunt finger to be projected beyond the periphery of the drum.

4. In a potato or like seed planter, the combination of a drum formed in its periphery with slots, carriers projecting from the periphery of the drum adjacent the slots, elements pivotally mounted in the drum, each element being formed at opposite ends with fingers, springs attached to the elements to rock the latter in one position to cause the fingers on one end of said elements to be projected through the slots and beyond the periphery of the drum and on one side of the carriers, and a fixed cam with which the elements engage to reversely rock the elements and withdraw the projected fingers and project the fingers at the opposite ends of the elements through the slots and beyond the periphery of the drum and on the other side of the carriers.

5. In a potato or like seed planter, the combination of a drum formed in its periphery with slots, carriers projecting from the periphery of the drum adjacent the slots, elements pivotally mounted in the drum, each element being formed at opposite ends with fingers, means attached to the elements to rock the latter in one direction to cause the fingers on one end of said elements to be projected through the slots and beyond the periphery of the drum on one side of the carriers to pierce the seed and hold same in position against said carriers, and means with which the elements subsequently engage to reversely rock the elements and withdraw the projected fingers and project the fingers at the opposite ends of the elements through the slots and beyond the periphery of the drum, and on the other side of the carriers to kick the potato therefrom.

6. In a potato or like seed planter, the combination of a drum formed in its periphery with slots, carriers projecting from the periphery of the drum adjacent the slots, elements pivotally mounted in the drum, each element being formed at opposite ends with fingers, means attached to the elements to rock the latter in one direction to cause the fingers on one end of said elements to be projected through the slots and beyond the periphery of the drum on one side of the carriers to pierce the seed and hold same in position against said carriers, and means with which the elements subsequently engage to reversely rock the elements and withdraw the projected fingers and project the fingers at the opposite ends of the elements through the slots and beyond the periphery of the drum and on the other side of the carriers to kick the potato therefrom, said means also including means to again reverse the movement of the elements, causing the extreme ends of the fingers to be within the drum between the time the potato is removed from the carrier and the time the elements are rocked to cause said fingers to pierce the potato.

7. In a potato or like seed planter, the combination of a hopper, a drum associated therewith, the periphery of the drum having a series of slots, carriers on the periphery of the drum adjacent the slots, a series of elements pivotally mounted in the drum, each element being formed at opposite ends with fingers, the fingers at one end of the elements being sharpened, and the fingers at the opposite ends of the elements being blunt, springs attached to the elements to rock same on their pivots to project the sharpened fingers through the slots and beyond the periphery of the drum to pierce potatoes held by the carriers, and a fixed cam with which the elements engage to reversely rock said elements to withdraw the sharpened fingers and project the blunt fingers through the slots and beyond the periphery of the drum and on the opposite side of the carriers to kick the potatoes therefrom.

In witness whereof I have hereunto set my hand in presence of witnesses.

JOHN HUTTON.

Witnesses:
J. HALLIDAY,
DAVID M. WILSON,
ELIZABETH MACLEOD.